HIGHLY RELIABLE RECTIFIER UNIT

Original Filed Aug. 6, 1956 2 Sheets-Sheet 1

INVENTOR:
Floyd G. Steele
By Seymour Scholnick
Attorney

Dec. 18, 1962 F. G. STEELE 3,069,562

HIGHLY RELIABLE RECTIFIER UNIT

Original Filed Aug. 6, 1956 2 Sheets-Sheet 2

INVENTOR:
Floyd G. Steele

By Seymour A. Scholnick
Attorney

United States Patent Office 3,069,562
Patented Dec. 18, 1962

3,069,562

HIGHLY RELIABLE RECTIFIER UNIT

Floyd G. Steele, La Jolla, Calif., assignor to Digital Control Systems, Inc., La Jolla, Calif.

Original application Aug. 6, 1956, Ser. No. 602,207, now Patent No. 2,910,584, dated Oct. 27, 1959. Divided and this application Aug. 24, 1959, Ser. No. 835,711
11 Claims. (Cl. 307—88.5)

The present invention relates to circuits for increasing the reliability of components for electronic digital computer or switching machines and more particularly to a diode quad unit having a reliability of operation far exceeding the reliability of a single diode. This is a divisional application of the copending application of Floyd G. Steele, Serial No. 602,207, filed August 6, 1956, for a "Voted-Output Flip-Flop Unit" which matured into U.S. Patent No. 2,910,584 on October 27, 1959.

Electronic digital computing or switching machines, as they are commonly constructed, comprise numbers of circuits ordinarily connected together such that the failure of any individual circuit will cause a malfunction of the total machine by producing a result that is, in fact, erroneous. In the parent application, a "voted-output" flip unit was disclosed having three independently operable flip-flops and a logical "voting circuit" which provided an output signal representing the state of the majority of them. Each of the flip-flops received the same input signals and the unit functioned with a reliability of operation vastly greater than the reliability of a single flip-flop. Further, catastrophic failure of a single flip-flop introduced no logical errors in the operation.

Although voting circuits add greatly to the reliability of such active element circuits such as flip-flops, there are applications in which such extremely high reliability is required, that the additional diodes in the voting circuits might detract from the ultimate reliability of the system. Therefore, it is desirable to construct the voting circuits and other gating circuits, so that they are virtually independent of diode failures.

According to the present invention, diodes are connected in a quad configuration to provide a quad diode unit which has an expected lifetime far in excess of that of an individual diode, and yet is a direct functional replacement for an individual diode. Either a quad of two series connected diodes in parallel, or alternatively, two parallel connected diodes in series with another pair of parallel connected diodes may be used. The choice of the particular quad configuration depends to a great extent upon whether, in the particular application, the failures of the individual diodes being replaced are primarily open circuits or short circuits.

It will be readily understood that if an individual diode in a gate is replaced by a more reliable, substitute component, such as a diode quad, the operational behavior of the substitute will be indistinguishable from the diode it replaces. As must be obvious, the voltages and currents which are applied to individual diodes or other computing circuit components during normal operation, do not exceed the rated operating limits of these components. In logical gating circuits, therefore, the problem of reliability that arises is not one of diode failure due to voltage or current overload, but rather diode failure due to aging and deterioration even though the diode has been operated within the recommended limits. When each individual diode of a gate is replaced by a diode quad, this condition, as to applied voltage and current of course continues to obtain. The voltages and currents applied to the diode quad are therefore well within the operating limits of a single diode. Under these conditions, it is obvious that not only will the failure of a single diode not overload the remaining diodes of the quad, but, more important, single diode failures will in no way disturb the operation of the quad. Rather, multiple diode failures in a single quad are required before the quad malfunctions.

It is therefore an object of the present invention to provide a diode rectifier unit which is several orders of magnitude more reliable than conventional diode rectifiers.

It is an additional object of the invention to replace individual diodes with diode quads for greatly increasing the reliability of gating circuits.

The novel features which are believed to be characteristic of the invention both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
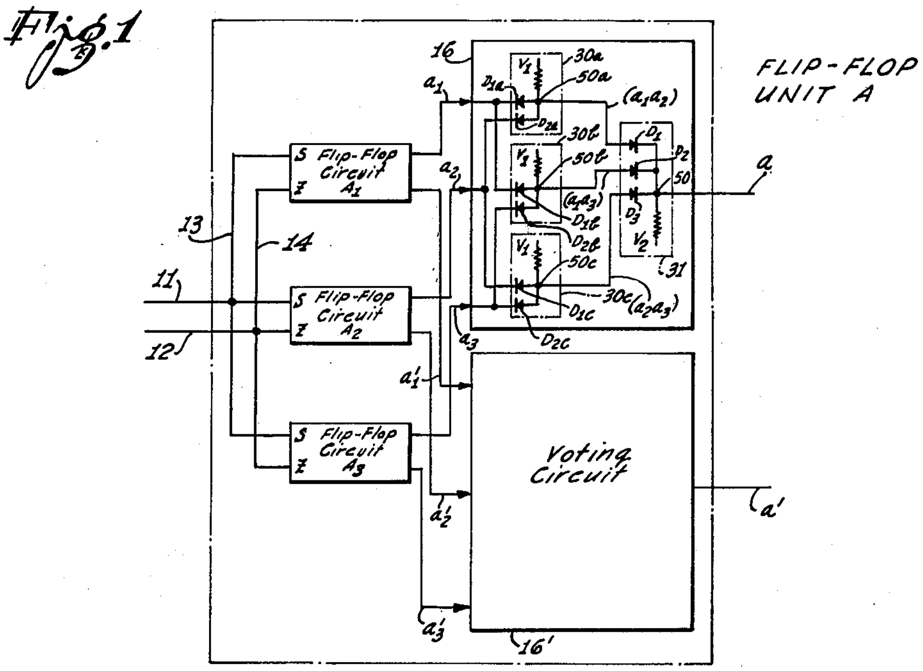
FIGURE 1 is a partly block, partly circuit diagram of a voted-output flip-flop unit according to the invention of the parent application.

Referring now to the drawings wherein like parts are similarly designated throughout the several views there is shown in FIGURE 1 in accordance with the invention of the parent application a partly block, partly circuit diagram of a highly reliable voted-output flip-flop unit designated flip-flop unit A which is operable for changing its stable state in response to input signals applied to input conductors 11 and 12 and for producing a bivalued voted-output signal $a$ (and also a complementary signal $a'$) whose value is representative of the stable state of the flip-flop unit. As shown in FIGURE 1, flip-flop unit A includes three conventional flip-flop circuits designated $A_1$, $A_2$ and $A_3$ respectively, each flip-flop circuit being independently settable either to a first state (designated the 1 state) or a second internal state (designated the 0 state) in response to application of input signals thereto; and producing corresponding bivalued output signals designated $a_1$, $a_2$ and $a_3$ respectively (and also corresponding complementary signals $a_1'$, $a_2'$ and $a_3'$) whose values are representative of the states of the corresponding flip-flop circuits.

Flip-flop unit A also includes conductors 13 and 14 interconnecting the input conductors 11 and 12 and the inputs of flip-flop circuits $A_1$ and $A_3$, conductors 11 and 13 being directly connected to flip-flop circuit $A_2$ so that each input signal is applied to all three of the flip-flop circuits in such manner as to set all three of the flip-flop circuits to the same state. The flip-flop unit further includes voting circuit 16 which receives bivalued output signals $a_1$, $a_2$ and $a_3$ produced by the three flip-flop circuits and combines these output signals to produce a bivalued voted-output signal, designated $a$, whose value is representative of like states of any two of the flip-flop circuits.

Thus, for example, if the states of flip-flop circuits $A_1$ and $A_2$ (or of $A_1$ and $A_3$, or of $A_2$ and $A_3$) are the same (both 1 or both 0) then the value of voted-output signal $a$ produced by voting circuit 16 will be such as to represent the common state of these two flip-flop circuits. Thus signal $a$ may have, as will be described, a high voltage level to represent a common 1 state of the two agreeing flip-flop circuits and a low voltage level to represent a common 0 state of the two agreeing flip-flop circuits or may represent the 1 and 0 states in other ways, as will be appreciated by those skilled in the art.

As shown in FIGURE 1, complementary signals $a_1'$, $a_2'$ and $a_3'$ are applied to a second voting circuit 16' which combines these signals in similar manner to produce the voted-output signal $a'$ which is complementary to signal $a$. Since the two voting circuits shown in FIGURE 1 may be identical in structure, and operation, the operation of the voting circuit will be described only in connection with the formation of signal $a$.

It will be recognized in view of the foregoing explanation that if all three flip-flop circuits $A_1$, $A_2$ and $A_3$ are operating properly, their states will be identical and, therefore, the value of voted-output signal $a$ produced by voting circuit 16 will represent the common state of the three flip-flop circuits. Suppose however that one of the flip-flop circuits fails so that it is in an incorrect state at a particular time and therefore produces an erroneously valued output signal. Since the flip-flop circuits operate independently of each other the remaining two flip-flop circuits, in response to the input signals, will be set to a common correct state and will produce correctly valued output signals. Voting circuit 16 in response to these output signals will therefore produce a voted-output signal representing the common or like state of the two correct flip-flop circuits.

It is thus seen that failure of one of the three flip-flop circuits does not impair the operation of the flip-flop unit of the present invention and that actually at least two of the flip-flop circuits must fail simultaneously before the flip-flop unit can produce an erroneous output signal. As explained hereinbefore because of this mode of operation the reliability of the flop-flop unit of the present invention is several orders of magnitude greater than the reliability of an individual flip-flop circuit.

Referring again to FIGURE 1, it will be assumed for purposes of explanation that flip-flop circuits $A_1$, $A_2$ and $A_3$ are conventional Eccles-Jordan type trigger circuits each of which has a set (S) input and a zero (Z) input each flip-flop being settable to a first (1) state or a second (0) state in response to signals selectively applied to its set (S) and zero (Z) inputs respectively, and operable for reversing state when signals are simultaneously applied to both of its inputs. The flip-flop circuit produces a first output signal which has a high voltage level when the flip-flop circuit is in its 1 state and a low voltage level when the flip-flop circuit is in its 0 state, and a second output signal complementary to the first having low and high voltage levels, respectively, when the flip-flop circuit is in its 1 and 0 states.

Conductor 11 is connected, either directly or through conductor 13, to the set (S) inputs of each of the flip-flop circuits and conductor 12 is connected, either directly or through conductor 14, to the zero (Z) inputs of each of the flip-flop circuits. Thus, it is clear that application of an input signal to input conductor 11 will have the effect of causing all three flip-flop circuits (if they are all operating properly) to be set to their 1 states while application of an input signal to conductor 12 will have the effect of setting all three of the flip-flop circuits to their 0 states. Simultaneous application of input signals to conductors 11 and 12 will cause all three of the flip-flop circuits to reverse state. Output signals $a_1$, $a_2$ and $a_3$ respectively produced by flip-flop $A_1$, $A_2$ and $A_n$ will (for the assumed type of flip-flop circuit) have high voltage levels when the corresponding flip-flop circuits are in the 1 state and low levels when the corresponding flip-flop circuits are in the 0 state and signals $a_1'$, $a_2'$ and $a_2'$ have voltage levels complementary thereto.

As shown in FIGURE 1, signals $a_1$, $a_2$ and $a_3$ are received by voting circuit 16 and combined thereby to produce voted-output signal $a$ whose voltage level is determined by agreement between the voltage levels of any two of signals $a_1$, $a_2$ and $a_3$. Thus if any pair of signals ($a_1$ and $a_2$, or $a_1$ and $a_3$, or $a_2$ and $a_3$) have the same voltage levels, signal $a$ will have a voltage level agreeing with the like-valued pair.

Voting circuit 16 includes three logical gates 30*a*, 30*b* and 30*c*, each receiving a different pair of the signals $a_1$, $a_2$, $a_3$ and producing corresponding resultant bivalued signals in accordance with a predetermined logical gating operation. Voting circuit 16 also including a fourth logical gating circuit 31 coupled to each of the logical gates 30*a*, 30*b* and 30*c* for combining the resultant signal produced thereby in accordance with a second logical gating operation to produce the bivalued voted-output signal.

In the specific embodiment of voting circuit 16 shown in FIGURE 1, gates 30*a*, 30*b*, 30*c* are conventional logical "and" gates receiving the pairs of signals $a_1$ and $a_2$, $a_1$ and $a_3$, $a_2$ and $a_3$, respectively, and combining these signals to produce corresponding resultant signals $(a_1a_2)$, $(a_1a_3)$ and $(a_2a_3)$ in accordance with the logical "and" operations; and gate 31 is a logical "or" gate which receives these resultant signals and combines them to produce voted-output signal $a$. A logical "and" gate as is well-known to those skilled in the art produces a high level output signal only if all the input signals applied thereto are high and otherwise produces a low level signal while a logical "or" gate producers a high level signal if any of the input signals applied thereto is high. Thus "and" gate 30*a* shown in FIGURE 1 produces the resultant signal $(a_1a_2)$ having a high level only when signals $a_1$ and $a_2$ are both high, gates 30*b* and 30*c* operating similarly in producing the resultant signals $(a_1a_3)$ and $(a_2a_3)$; while "or" gate 31 is operable for combining these three resultant signals to produce voted-output signal $a$ having a high level only when any of the signals $(a_1a_2)$ *or* $(a_1a_3)$ *or* $(a_2a_3)$ is high.

"And" gate 30*a* comprises two diode rectifiers $D_{1a}$ and $D_{2a}$ to whose cathodes the signals $a_1$ and $a_2$ are respectively applied, the anodes of these rectifiers being connected in common to a lower terminal 50*a* of a resistor whose upper terminal is connected to a source of relatively high voltage $V_1$. In the operation of "and" gate 30*a* if signal $a_1$ or signal $a_2$ is low, the associated diode $D_{1a}$ or $D_{2a}$ will be strongly forward biased so that it remains strongly conductive thereby effectively establishing a short circuit between the source of signal $a_1$ or $a_2$ and terminal 50*a*. Thus the signal at terminal 50*a* (signal $a_1a_2$) will remain low if either signal $a_1$ or $a_2$ is low and will go high only when $a_1$ *and* $a_2$ are both high.

"And" gates 30*b* and 30*c* are similarly constructed utilizing diode rectifiers $D_{1b}$, $D_{2b}$, $D_{1c}$, $D_{2c}$, respectively. As further shown in FIGURE 1, "or" gate 31 comprises three diode rectifiers $D_1$, $D_2$ and $D_3$ whose cathodes are connected in common to upper terminal 50 of a resistor whose lower terminal is connected to a source of relatively low voltage $V_2$, the signals $(a_1a_2)$, $(a_1a_3)$ and $(a_2a_3)$ being applied respectively to the cathodes of rectifiers $D_1$, $D_2$ and $D_3$. If any of these signals has a high voltage level, the associated diode rectifier will be forward biased (conductively biased) so that the low voltage level will be impressed upon terminal 50. Thus signal $a$ at terminal 50 will normally be low (because of the effect of the low voltage $V_2$) and will be high only if one of signals $(a_1a_2)$ *or* $(a_1a_3)$ *or* $(a_2a_3)$ is high.

Although relatively high reliability can be obtained by using the voting circuit presented above without modification, there are however some applications in which such extremely high reliability is required that it is desirable to construct the voting circuits, or other gating circuits, so that they are still further independent of short circuiting or open circuiting of diodes. In such applications, it is desirable to replace the individual diode rectifiers utilized with four element diode rectifier units of the type shown in FIGURES 2 and 3 below.

Figure 2:
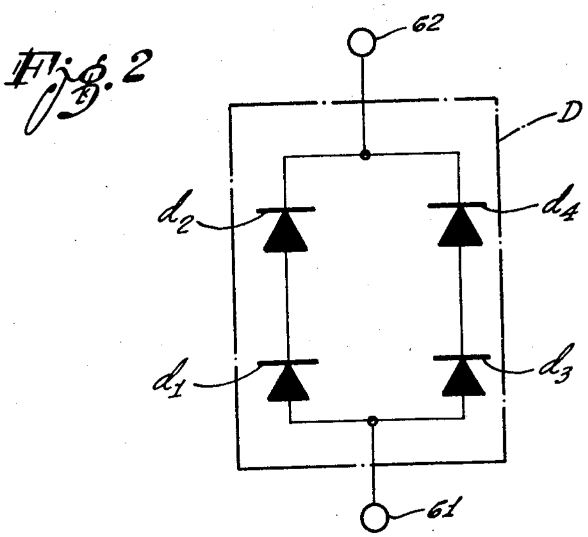
FIGURE 2 is a circuit diagram of a highly reliable diode rectifier unit according to the present invention.

In FIGURE 2, there is shown a diode rectifier unit D which comprises four individual diode rectifiers $d_1$, $d_2$, $d_3$ and $d_4$ and is operable for conducting current unidirectionally from an input terminal 61 to an output terminal 62. Diode $d_1$ has its anode connected to input terminal 61 and its cathode connected to the anode of diode $d_2$ which has its cathode connected to output terminal 62. Diode $d_3$ also has its anode connected to input terminal 61 and its cathode connected to the anode of diode $d_4$ which has its cathode connected to output terminal 62. Rectifier unit D thus includes two branches, one branch being a series connection of the diodes $d_1$ and $d_2$ between the input and output terminals and the other branch being a series connection of diodes $d_3$ and $d_4$ between the input and output terminals. It is clear from a consideration of FIGURE 2 that before rectifier unit D can fail, there must be an opening of two diodes in unlike branches or a shorting of two diodes in the same branch. Thus, it is apparent that the reliability of rectifier unit D is far higher than the reliability of an individual diode rectifier and therefore by substituting diode unit D for each individual diode rectifier of voting circuit 16, enormously high reliability of operation may be obtained.

Figure 3:
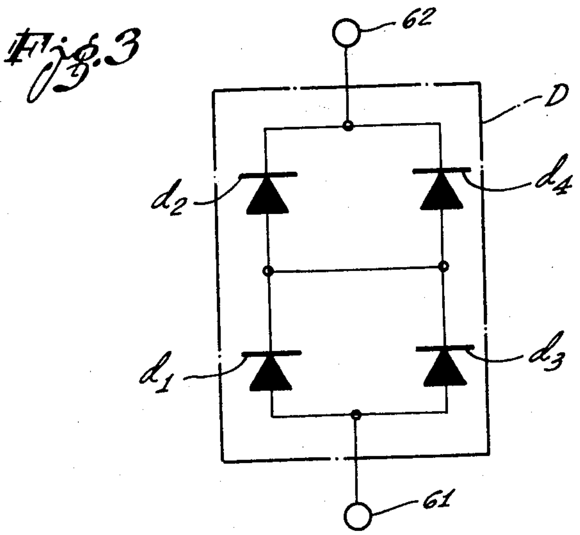
FIGURE 3 is a circuit diagram of an alternative highly reliable diode rectifier unit.

A modified form of rectifier unit D' is shon in FIGURE 3 in which the cathodes of diodes $d_1$ and $d_3$ (and hence the anodes of diodes $d_2$ and $d_4$) have been connected together. In operation this form of rectifier unit D' differs from that shown in FIGURE 2 in that it is more independent of open circuits while being less independent of short circuits. For example, if in FIGURE 3, diode $d_1$ were open-circuited, only open-circuiting of $d_3$ (alone) can stop operation; while in FIGURE 2, if $d_1$ were open-circuited, open-circuiting of either $d_3$ or $d_4$ would stop operation of the unit.

In the same way, referring again to FIGURE 3, if $d_1$ were shorted, shorting of either $d_2$ or $d_4$ would stop operation, while in FIGURE 2, if $d_1$ were shorted, only shorting of $d_2$ (alone) would stop correct operation of the unit. It is thus clear that choice for a particular application between the embodiments of FIGURES 2 and 3 would be determined by analysis of the relative probabilities of open-circuiting or short-circuiting of diodes.

Figure 4:
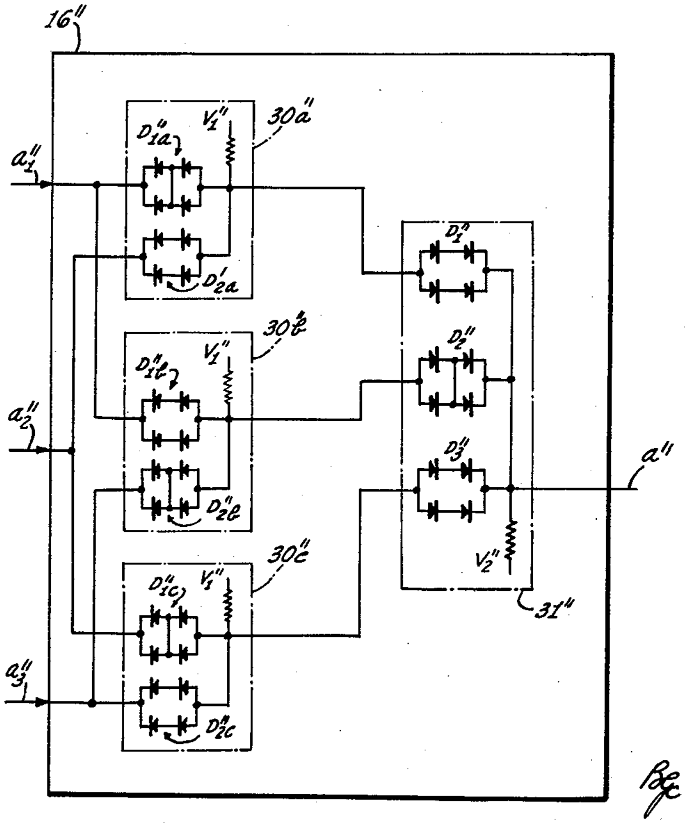
FIGURE 4 is a circuit diagram of a voting circuit using the highly reliable rectifier units of FIGURES 2 and 3.

Turning now to FIGURE 4, for purposes of illustration, the voting circuit 16 of FIGURE 1 has been redrawn as circuit 16'' in which diode quads, such as shown in FIGURES 2 and 3 have been substituted for the individual gating diodes of FIGURE 1. It may be seen, for example, that diode $D_{1a}$ of the "and" gate 30*a* has been replaced here by a typical diode quad $D''_{1a}$ of FIGURE 3. Diode $D_{2a}$ has been replaced by a diode quad $D''_{2a}$ such as shown in FIGURE 2.

Although the diode quads of FIGURES 2 and 3 are not identical, they are virtually interchangeable unless the particular diode for which a quad is being substituted is more prone to failure in a particular manner, such as an open circuit or a short circuit. If open circuits are more prevalent, then it is preferable to use the diode quad of FIGURE 3. On the other hand, if short circuits are more frequently encountered, then the quad of FIGURE 2 would provide greater reliability.

As may be seen from an inspection of FIGURE 4, each gating diode of the voting circuit 16 of FIGURE 1 has ben replaced by a more reliable diode quad. The circuit operation, as set forth above, is otherwise unchanged.

It will be obvious that the probability of catastrophic failure of a diode quad is smaller by several orders of magnitude than the failure of an individual diode and it will be appreciated that it is necessary to have simultaneous catastrophic failures in several of the quads before errors will be introduced. It is therefore clear that extremes of reliability may easily be achieved by the simple expedient of substituting diode quads for diodes thereby assuring greatly increased longevity of circuits with greater confidence.

What is claimed as new is:

1. In logical diode gating circuits for use with flip-flop circuits in electronic digital computing and switching machines, a highly reliable rectifier unit for passing bivalued signals representing information unidirectionally from an input terminal to an output terminal, said rectifier unit comprising: first, second, third and fourth diode rectifiers each having an anode and a cathode; said first diode rectifier having its anode conductively connected to the input terminal and having its cathode conductively connected to the anode of said second diode rectifier; said third diode rectifier having its anode conductively connected to said input terminal and its cathode connected to the anode of said fourth diode rectifier; and said second and fourth diode rectifiers having their cathodes conductively connected to said output terminal; the signals being limited in voltage and current to magnitudes less than the least rated voltage and current of any of said diode rectifiers whereby short-circuiting or open-circuiting of any one of the diode rectifiers does not impair the operation of the rectifier unit.

2. In logical diode gating circuits for use with flip-flop circuits in electronic digital computing and switching machines, a highly reliable rectifier unit for passing current signals representing information unidirectionally from an input terminal to an output terminal, said rectifier unit comprising: a first, second, third and fourth diode rectifier each having a cathode and an anode, said first and third diode rectifiers having their anodes conductively connected to said input terminal; said second and fourth diode rectifiers having their cathodes conductively connected to said output terminals; and means for conductively connecting the cathodes of said first and third diode rectifiers to the anodes of said second and fourth diode rectifiers, the current signals being limited to magnitudes less than the least rated current of any of said diode rectifiers.

3. In a logical diode gating circuit for use with flip-flop circuits in electronic digital computing and switching machines, the combination comprising: a highly reliable rectifier unit for unidirectionally conducting bivalued signals representing information from an input terminal to an output terminal, said rectifier unit including first, second, third and fourth diode rectifiers each having an anode and a cathode; said first and third diode rectifiers having their anodes commonly connected to one of the terminals and having their cathodes connected respectively to the anodes of said second and fourth diode rectifiers; said second and fourth diode rectifiers having their cathodes commonly connected to the other of the terminals; means for applying a potential to at least one of the terminals, said potential being limited in magnitude to the least rated voltage of any of said diode rectifiers; and means for limiting the current flow through said rectifier unit to a magnitude less than the least rated current of any of said diode rectifiers; whereby operation of said rectifier unit is unimpaired by failure of any of said diode rectifiers.

4. In a logical diode gating circuit for use with flip-flop circuits in electronic digital computing and switching machines, the combination comprising: a highly reliable rectifier unit for unidirectionally conducting bivalued signals representing information from an input terminal to an output terminal, said rectifier unit including first, second, third and fourth diode rectifiers each having a cathode and an anode; said first and third diode rectifiers having their anodes commonly connected to one of the terminals; said second and fourth diode rectifiers having their cathodes commonly connected to the other of the terminals; means for connecting the cathodes of said first and third diode rectifiers to the anodes of said second and fourth diode rectifiers; means for applying a potential to at least one of the terminals, said potential being limited in magnitude to the least rated voltage of any of said diode rectifiers; and means for limiting the current flow through said rectifier unit to a magnitude less than the least rated current of any of said diode rectifiers; whereby operation of said rectifier unit is unimpaired by failure of any of said diode rectifiers 5. A highly reliable logical diode gating circuit for use in electronic digital computing and switching machines comprising: a first and second diode rectifier quad units each having input and output terminals and including first, second, third and fourth diode rectifiers each having an anode and a cathode, said first and third diodes having their anodes commonly connected to one of said terminals and their cathodes respectively connected to said second and fourth diode anodes, and said second and fourth diodes having their cathodes commonly connected to the other of said terminals; means adapted to connect said first quad unit input terminal to a first source of bivalued signals representing information; means adapted to connect said second quad unit input terminal to a second source of bivalued signals representing information; and means including an output junction commonly connected to said output terminals for applying a bias to said rectifier diode quad units; whereby signals appearing at said output junction have a first value in response to application of first value signals at both input terminals, and have a second value in response to application of second value signals at both input terminals, and whereby operation of said gating circuit is independent of the failure of a single diode in a diode quad unit.

6. The gating circuit of claim 5, further including means commonly connecting said first and third diode cathodes.

7. The gating circuit of claim 5 wherein said first and third diode anodes are connected to said input terminals.

8. The gating circuit of claim 5 wherein said first and third diode anodes are connected to said output terminals.

9. The gating circuit of claim 5 wherein application of first value signals at either of said input terminals results in a first value signal at said output junction.

10. In logical diode gating circuits for use with flip-flop circuits in electronic digital computing and switching machines, a highly reliable rectifier unit for passing current signals representing information unidirectionally from an input terminal to an output terminal, said rectifier unit comprising: a first, second, third and fourth diode rectifier each having a cathode and an anode, said first and third diode rectifiers having their anodes conductively connected to said input terminal; said second and fourth diode rectifiers having their cathodes conductively connected to said output terminals; and means for conductively connecting the cathodes of said first and third diode rectifiers to the anodes of said second and fourth diode rectifiers, said means including conductive means for commonly connecting the cathodes of said first and third diode rectifiers, the current signals being limited to magnitudes less than the least rated current of any of said diode rectifiers.

11. In a logical diode gating circuit for use with flip-flop circuits in electronic digital computing and switching machines, the combination comprising: a highly reliable rectifier unit for unidirectionally conducting bivalued signals representing information from an input terminal to an output terminal, said rectifier unit including first, second, third and fourth diode rectifiers each having an anode and a cathode; said first and third diode rectifiers having their anodes commonly connected to one of the terminals and having their cathodes connected respectively to the anodes of said second and fourth diode rectifiers; said second and fourth diode rectifiers having their cathodes commonly connected to the other of the terminals; conductive means for commonly connecting the cathodes of said first and third diode rectifiers; means for applying a potential to at least one of the said terminals, said potential being limited in magnitude to the least rated voltage of any of said diode rectifiers; and means for limiting the current flow through said rectifier unit to a magnitude less than the least rate current of any of said diode rectifiers; whereby operation of said rectifier unit is unimpaired by failure of any of said diode rectifiers.

References Cited in the file of this patent

UNITED STATES PATENTS

| | | |
|---|---|---|
| 1,959,513 | Weyandt | May 22, 1934 |
| 2,123,859 | Winograd | July 12, 1938 |
| 2,255,378 | Colchester | Sept. 9, 1941 |
| 2,444,458 | Master | July 6, 1948 |
| 2,803,703 | Sherwin | Aug. 20, 1957 |
| 2,813,243 | Christian et al. | Nov. 12, 1957 |
| 2,874,331 | Otto | Feb. 17, 1959 |
| 2,895,099 | Dortort | July 14, 1959 |

OTHER REFERENCES

Proc. I.R.E., April 1956, vol. 44, No. 4, pages 509–515, "Increasing Reliability by the Use of Redundant Circuits," Creveling.